(12) United States Patent
Taniguchi et al.

(10) Patent No.: US 11,878,636 B2
(45) Date of Patent: Jan. 23, 2024

(54) AUTOMOTIVE INTERIOR COMPONENT

(71) Applicant: Nissha Co., Ltd., Kyoto (JP)

(72) Inventors: Chuzo Taniguchi, Kyoto (JP); Tatsuo Ito, Kyoto (JP); Yasuhide Fukada, Kyoto (JP); Daichi Hama, Kyoto (JP); Eiji Kawashima, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 393 days.

(21) Appl. No.: 17/432,055

(22) PCT Filed: Jan. 6, 2020

(86) PCT No.: PCT/JP2020/000042
§ 371 (c)(1),
(2) Date: Aug. 18, 2021

(87) PCT Pub. No.: WO2020/170615
PCT Pub. Date: Aug. 27, 2020

(65) Prior Publication Data
US 2023/0249633 A1 Aug. 10, 2023

(30) Foreign Application Priority Data
Feb. 18, 2019 (JP) ................................ 2019-026507

(51) Int. Cl.
*B60R 13/02* (2006.01)
(52) U.S. Cl.
CPC ...... *B60R 13/02* (2013.01); *B60R 2013/0287* (2013.01)

(58) Field of Classification Search
CPC ........... B60R 13/02; B60R 2013/0287; H01H 35/00; G01J 1/0488
See application file for complete search history.

(56) References Cited

U.S. PATENT DOCUMENTS

| 10,203,411 B2 * | 2/2019 | Jones ................ H01L 31/02162 |
| 10,794,757 B2 * | 10/2020 | Okumura ............... G01S 7/4813 |
| 11,193,831 B2 * | 12/2021 | Okumura .......... B29C 45/14508 |
| 2002/0041968 A1 * | 4/2002 | Sada ....................... B32B 7/023 |
| | | 428/447 |
| 2016/0238707 A1 * | 8/2016 | Thomas .................. H02J 50/60 |
| 2018/0297252 A1 * | 10/2018 | Kashiwagi ........... B32B 27/365 |

FOREIGN PATENT DOCUMENTS

| JP | H08334408 A | * 10/1996 |
| JP | 2003-004526 | 1/2003 |
| JP | 2003-165357 | 6/2003 |
| JP | 2010-243436 | 10/2010 |
| JP | 2010243436 A | * 10/2010 |
| JP | 2015-151104 | 8/2015 |
| JP | 2017-094640 | 6/2017 |

(Continued)

*Primary Examiner* — Lori Lyjak
(74) *Attorney, Agent, or Firm* — JCIPRNET (57) ABSTRACT

An automotive interior component is provided which includes: an infrared sensor that includes an emission unit and a reception unit, the emission unit emitting infrared rays to an object, and the reception unit receiving the infrared rays reflected by the object; a molded body in which the infrared sensor is installed; and a surface material disposed so as to cover the infrared sensor, the surface material transmitting the infrared rays.

8 Claims, 8 Drawing Sheets

(56) References Cited

FOREIGN PATENT DOCUMENTS

| | | | |
|---|---|---|---|
| JP | 2017-207795 | 11/2017 | |
| JP | 2018-039446 | 3/2018 | |
| JP | 2018-154223 | 10/2018 | |
| JP | 6406308 B2 * | 10/2018 | ............ B60K 35/00 |
| JP | 2018-190212 | 11/2018 | |
| KR | 20110011056 A * | 2/2011 | |

* cited by examiner

(Prior Art)

AUTOMOTIVE INTERIOR COMPONENT

CROSS REFERENCES TO RELATED APPLICATIONS

This application is a continuation of International Application No. PCT/JP2020/000042, filed on Jan. 6, 2020, which claims priority to Japanese Patent Application 2019-026507, filed on Feb. 18, 2019, which is incorporated herein by reference.

TECHNICAL FIELD

The present disclosure relates to an automotive interior component.

BACKGROUND

Figure 8:
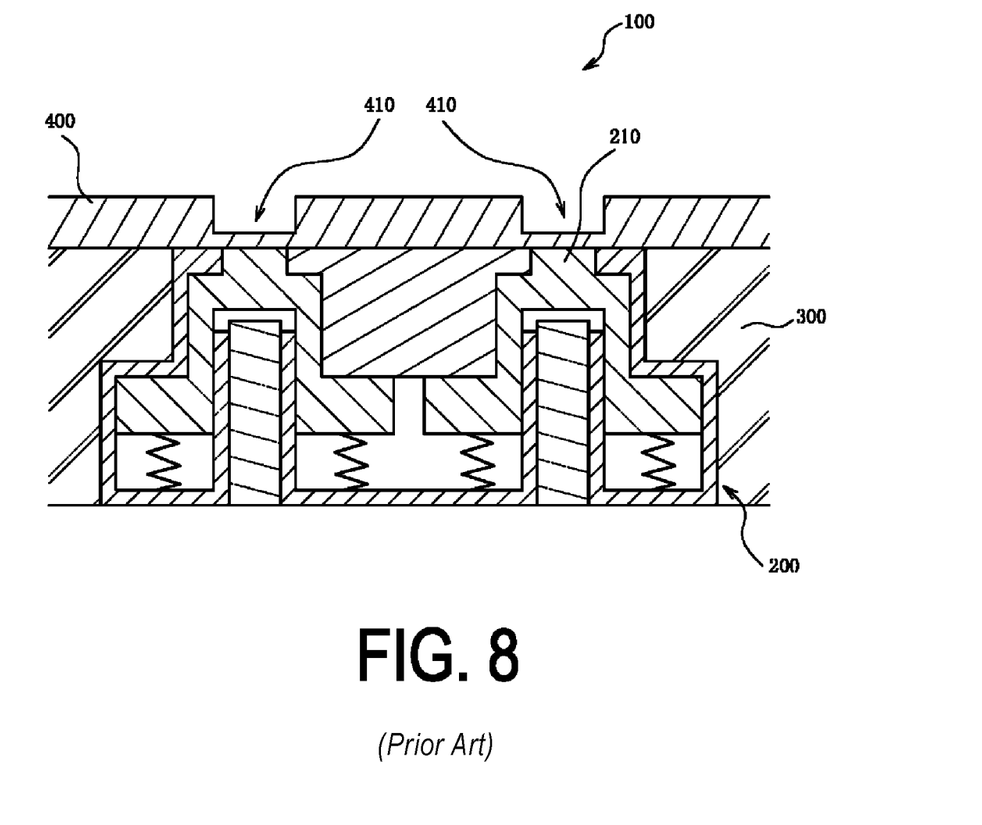
FIG. 8 is a schematic cross-sectional view illustrating a conventional automotive interior component.

For example, a surface material is bonded to an automotive interior component, such as an instrument panel and a center console, so as to cover a surface of a resin molded article. The interior component is provided with a switch for actuating each device, such as an air conditioner and an audio device. As such an interior component, for example, Japan Unexamined Patent Publication No. 2003-165357 discloses an automotive interior component 100 that includes a molded body 300 incorporating a switch base 200 including a switch pressing unit 210 and a surface material 400 bonded to the surface of the molded body (see FIG. 8). A marking portion 410, which serves as a sign indicative of the position of the switch pressing unit 210, is formed on the surface material 400. The marking portion 410 is a recessed portion formed on the surface of the surface material 400. Accordingly, a step is formed around the marking portion 410. A driver can recognize the position of the switch pressing unit 210 by touching the step without visually confirming the marking portion 410, and by pressing the switch, the switch can be switched between on and off.

However, with the conventional automotive interior component, pressing the switch is required to actuate each device in a vehicle cabin, causing a problem that each device cannot be operated in a non-contact manner. In addition, since the marking portion is formed on the surface material to distinguish the position of the switch, causing a problem that design of the interior components lacks in uniformity.

SUMMARY

The present disclosure provides an automotive interior component that is configured to actuate each device in a vehicle cabin in a non-contact manner and is integrally designed.

Some aspects will be described below as means to solve the problems. These aspects can be combined optionally, as needed.

An automotive interior component of the present disclosure includes an infrared sensor, a molded body, and a surface material. The infrared sensor includes an emission unit and a reception unit. The emission unit emits infrared rays to an object. The reception unit receives the infrared rays reflected by the object. In the molded body, the infrared sensor is installed. The surface material is disposed so as to cover the infrared sensor. The surface material transmits the infrared rays.

The surface material may have an infrared transmittance of 60% or more.

The reception unit of the infrared sensor may be an imaging element.

A color difference ΔE between regions corresponding to the emission unit and the reception unit of the infrared sensor and a region other than the regions in the surface material may be 10 or less.

The automotive interior component of the present disclosure includes the infrared sensor, the molded body, and the surface material. The infrared sensor includes the emission unit and the reception unit. The emission unit emits the infrared rays to the object. The reception unit receives the infrared rays reflected by the object. In the molded body, the infrared sensor is installed. The surface material is disposed so as to cover the infrared sensor. The surface material transmits the infrared rays.

Therefore, the automotive interior component of the present disclosure is configured to actuate each device in a vehicle cabin in a non-contact manner and is integrally designed.

DETAILED DESCRIPTION

Hereinafter, an example of an embodiment of an automotive interior component of the present disclosure will be described with reference to the drawings.

An automotive interior component 1 of the present disclosure includes an infrared sensor 2, a molded body 3, and a surface material 4. The infrared sensor 2 includes an emission unit 2a and a reception unit 2b. The emission unit 2a emits infrared rays to an object. The reception unit 2b receives the infrared rays reflected by the object. In the molded body 3, the infrared sensor 2 is installed. The surface material 4 is disposed so as to cover the infrared sensor 2. The surface material 4 transmits the infrared rays (see FIG. 1).

Figure 1:
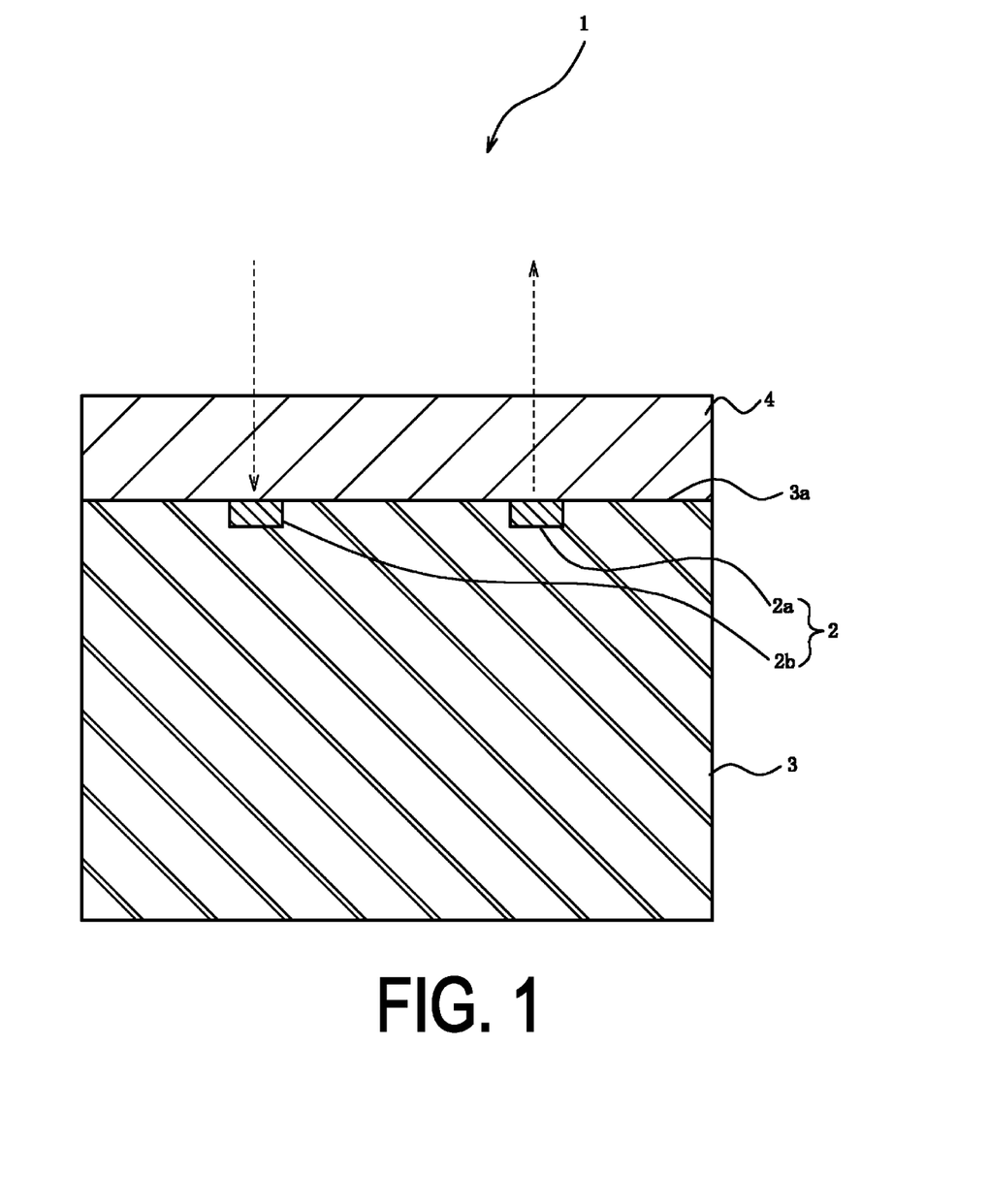
FIG. 1 is a schematic cross-sectional view illustrating an embodiment of an automotive interior component.

The infrared sensor 2 includes the emission unit 2a and the reception unit 2b. So-called an active sensor is used. The emission unit 2a emits infrared rays to the object, and the reception unit 2b receives the infrared rays reflected by the object. One that reacts with near infrared rays with a wavelength of 700 nm to 2500 nm is used as the infrared sensor 2 according to an application. As illustrated in FIG.

1, the emission unit 2a and the reception unit 2b are installed in the molded body 3 so that a surface 3a of the molded body 3 becomes flat. Note that the emission unit 2a and the reception unit 2b may be separate or integrated.

The molded body 3 incorporates the infrared sensor 2. The molded body 3 has, for example, a shape of a center console. The center console is provided between a driver's seat and a passenger seat extending in a front-rear direction of a vehicle. As examples of the material of the molded body 3, a thermoplastic resin, a thermosetting resin, a fiber reinforced resin, a foam resin, and a two-part reaction curable resin can be used.

Figure 2:
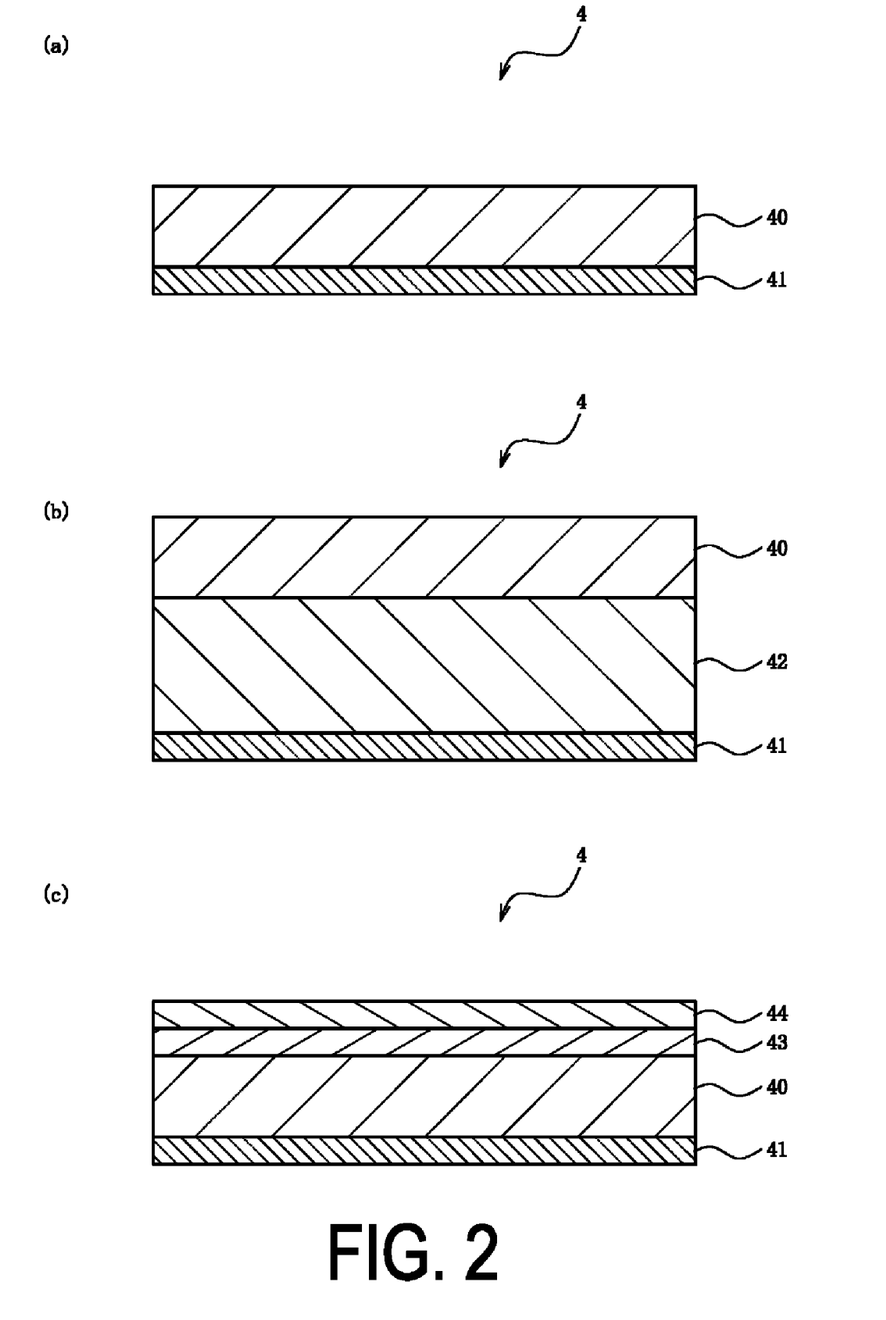
FIG. 2 is a schematic cross-sectional view illustrating an example of a layer structure of a surface material.

The surface material 4 includes a surface layer 40. As examples of the material of the surface layer 40, a polyethylene terephthalate resin, a polycarbonate resin, an acrylic resin, a urethane resin, a polyvinyl chloride resin (PVC), a silicone resin, a fluorine resin, a thermoplastic elastomer (for example, olefin-based, urethane-based, and styrene-based) resin, a nonwoven, an artificial leather, a synthetic leather, a flocked sheet, a fabric, and a veneer whose raw material is a real wood material or a stone can be used. The surface material 4 may be formed of only the surface layer 40 or may have another layer. Examples of other layers include a base cloth 41 (see FIG. 2(a)) adhered to the back surface of the surface layer 40, an intermediate layer 42 (see FIG. 2(b)) formed between the surface layer 40 and the base cloth 41, a printed layer 43 formed on the surface of the surface layer 40, and a surface treatment layer 44 (see FIG. 2(c)) formed on the outermost surface of the surface material 4. The base cloth 41 is, for example, a woven fabric, a knitted fabric, and a nonwoven fabric. The intermediate layer 42 is, for example, a layer having a cushion property made of a foamed resin. The printed layer 43 is, for example, any pattern formed using ink. The surface treatment layer 44 is, for example, a resin layer containing organic particles, and can provide the surface material 4 with, for example, a wear resistance and a smooth texture.

The surface material 4 transmits infrared rays. The surface material 4 that transmits infrared rays can be obtained by, for example, the following methods.

(1) A method that mixes a pigment or a dye that transmits infrared rays with the respective resins constituting the surface layer 40, the intermediate layer 42, the printed layer 43, and the surface treatment layer 44

Figure 3:
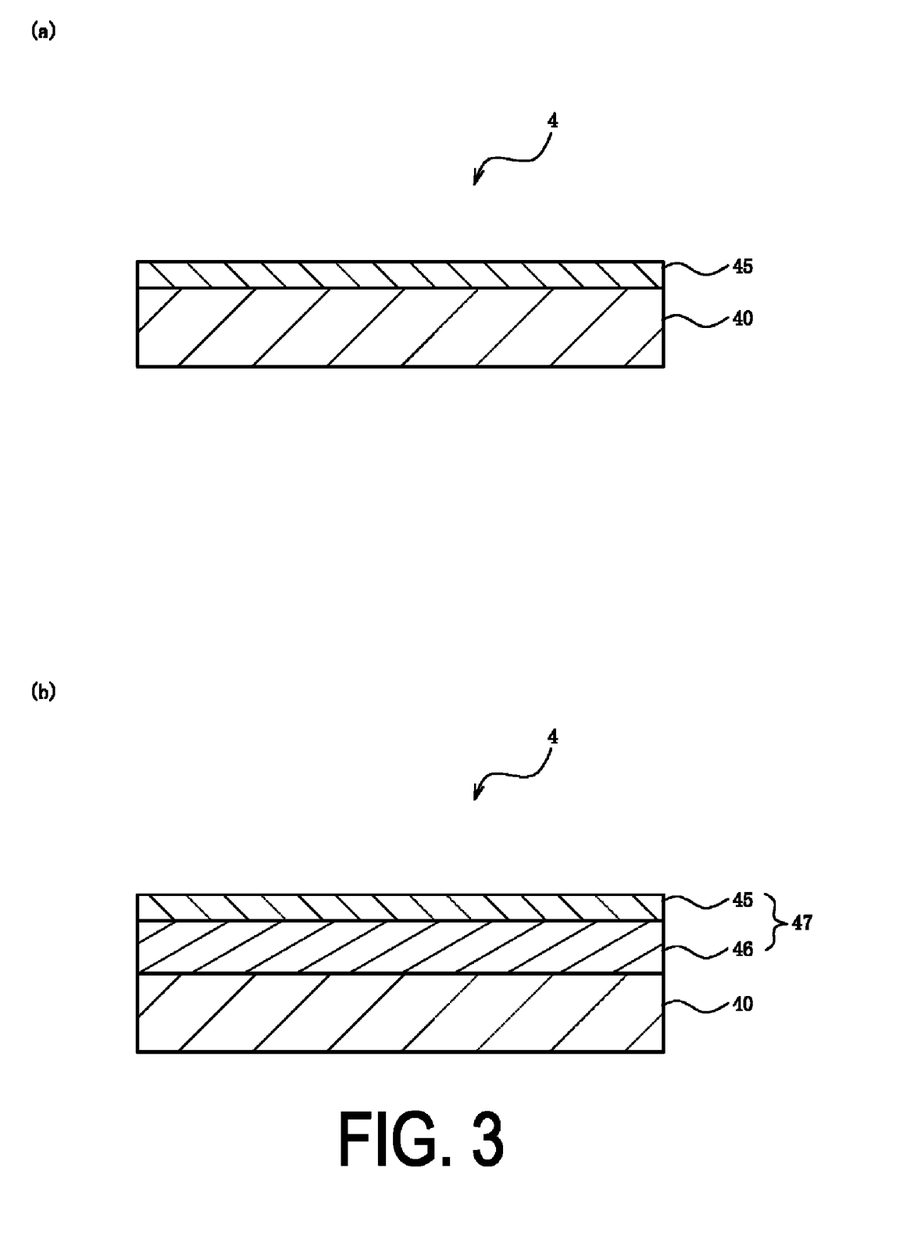
FIG. 3 is a schematic cross-sectional view illustrating another example of the layer structure of the surface material.

(2) A method that coats ink 45 containing a pigment or a dye that transmits infrared rays over the transparent surface layer 40 (see FIG. 3(a))

(3) A method that bonds an infrared transparent sheet 47, which is formed by coating the ink 45 containing a pigment or a dye that transmits infrared rays over a base substrate 46 to the transparent surface layer 40 (see FIG. 3(b))

In (3), the base substrate 46 may be transparent or may be formed by kneading a pigment or a dye that transmits infrared rays.

The surface materials 4 obtained by the above-described methods allow all layers constituting the surface materials to transmit infrared rays.

Figure 4:
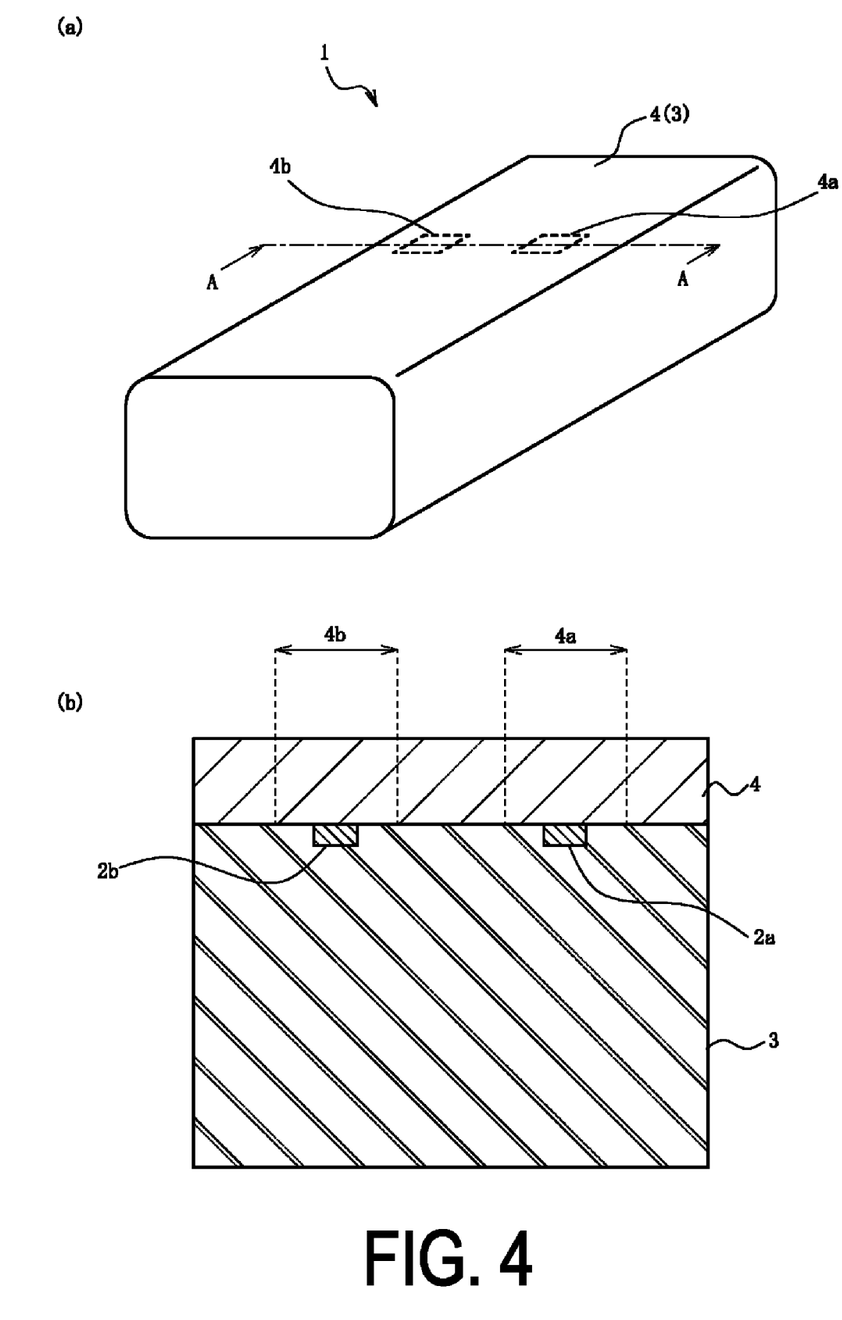
FIG. 4(a) is a schematic perspective view illustrating an automotive interior component partially including infrared transmission regions.
FIG. 4(b) is an A-A cross-sectional view of FIG. 4(a).

As described above, one that reacts with near infrared rays with a wavelength of 700 nm to 2500 nm is used as the infrared sensor 2 according to an application. Therefore, the surface material 4 also needs to transmit near infrared rays with a wavelength of 700 nm to 2500 nm. A region that transmits infrared rays may be the entire surface of the surface material 4, or may be a region 4a corresponding to the emission unit 2a and a region 4b corresponding to the reception unit 2b of the infrared sensor 2 (see FIG. 4).

Figure 5:
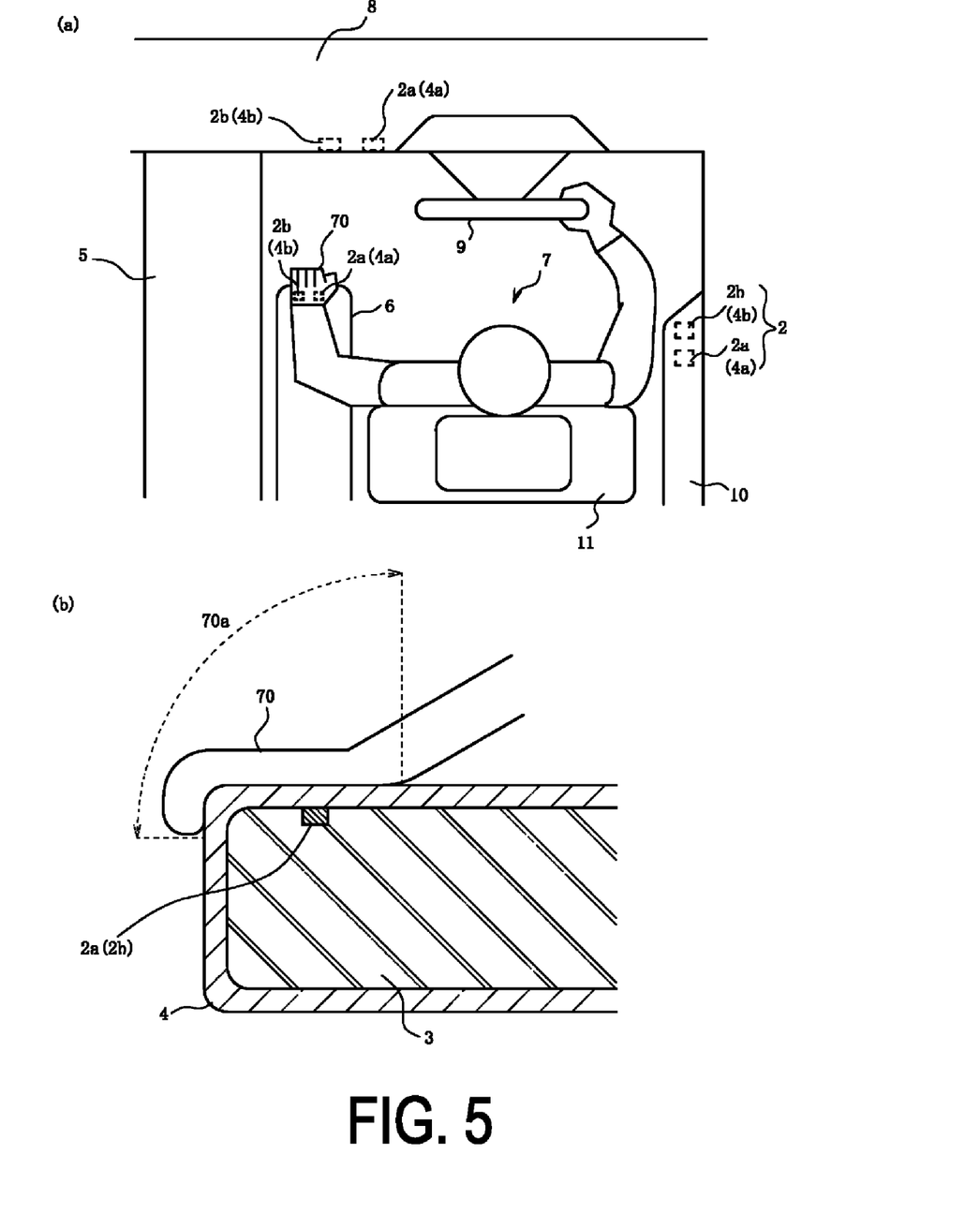
FIG. 5(a) is a schematic plan view illustrating an example of an application part of the automotive interior component.
FIG. 5(b) is a schematic cross-sectional view illustrating an example of the automotive interior component.

The automotive interior component 1 of the present disclosure is applicable to, for example, a center console 5 and an armrest 6 (see FIG. 5). For example, in a case where the infrared sensor 2 is installed in a region 70a where a hand 70 of a driver 7 is placed during normal operation (see FIG. 5(b)), when the driver 7 places the hand 70 on the center console 5 or the armrest 6, the infrared rays emitted from the emission unit 2a are reflected by the hand 70 and received by the reception unit 2b. The received infrared rays are preferably configured to control each device in the vehicle cabin. For example, there is provided a control that, when the hand 70 is placed on the armrest 6, a switch for an air conditioning is switched on and the switch is switched off when a predetermined period elapses after releasing the hand 70 from the armrest 6. In addition, with reference to FIG. 5(a), there is provided a control that moving the hand 70 right and left adjusts a sound volume of an audio device or selects music. By configuring the automotive interior component and each device so as to ensure such a control, the driver does not need to press the switch for each device as in the conventional case. That is, each device in the vehicle cabin can be operated in a non-contact manner. In addition, since the automotive interior component of the present disclosure incorporates the infrared sensor 2 and the surface of the automotive interior component 1 is flat, the automotive interior component can be integrally designed.

The automotive interior component 1 is applicable to, for example, an instrument panel 8, a steering wheel 9, a door trim 10, a seat 11 (a seat), and each pillar trim. For example, with these components, whether an occupant is present in a driver's seat or another location can be detected (presence detection). With the instrument panel 8 and the steering wheel 9, a posture and a movement of the driver 7 can be detected and whether the driver 7 does not doze off or whether abnormality does not occur in the body can be detected. With the door trim 10, a control in which the infrared sensor 2 is installed at the position (see, for example, FIG. 5(a)) where the hand 70 of the driver 7 is placed, a power window opens when the driver 7 places the hand 70, and the power window is closed when a predetermined period has elapsed after the hand 70 is released can be performed.

An infrared transmittance at a region that transmits infrared rays in the surface material 4 may be 60% or more. Preferably, it is 80% or more. The infrared transmittance of at least 60% or more allows emitting a sufficient amount of infrared rays to the object, and the sufficient amount of infrared rays can be received from the object. In other words, the infrared sensor 2 is likely to be more functional.

The reception unit 2b of the infrared sensor 2 may be an imaging element 2c. The automotive interior component 1 allows authentication, for example, using at least one of a vein, an iris, and a face. The imaging element is an element that converts an image into an electrical signal. As examples of the imaging element, a Charge Coupled Device (CCD), a Complementary Metal Oxide Semiconductor (CMOS), and an organic thin film imaging element can be used.

Figure 6:
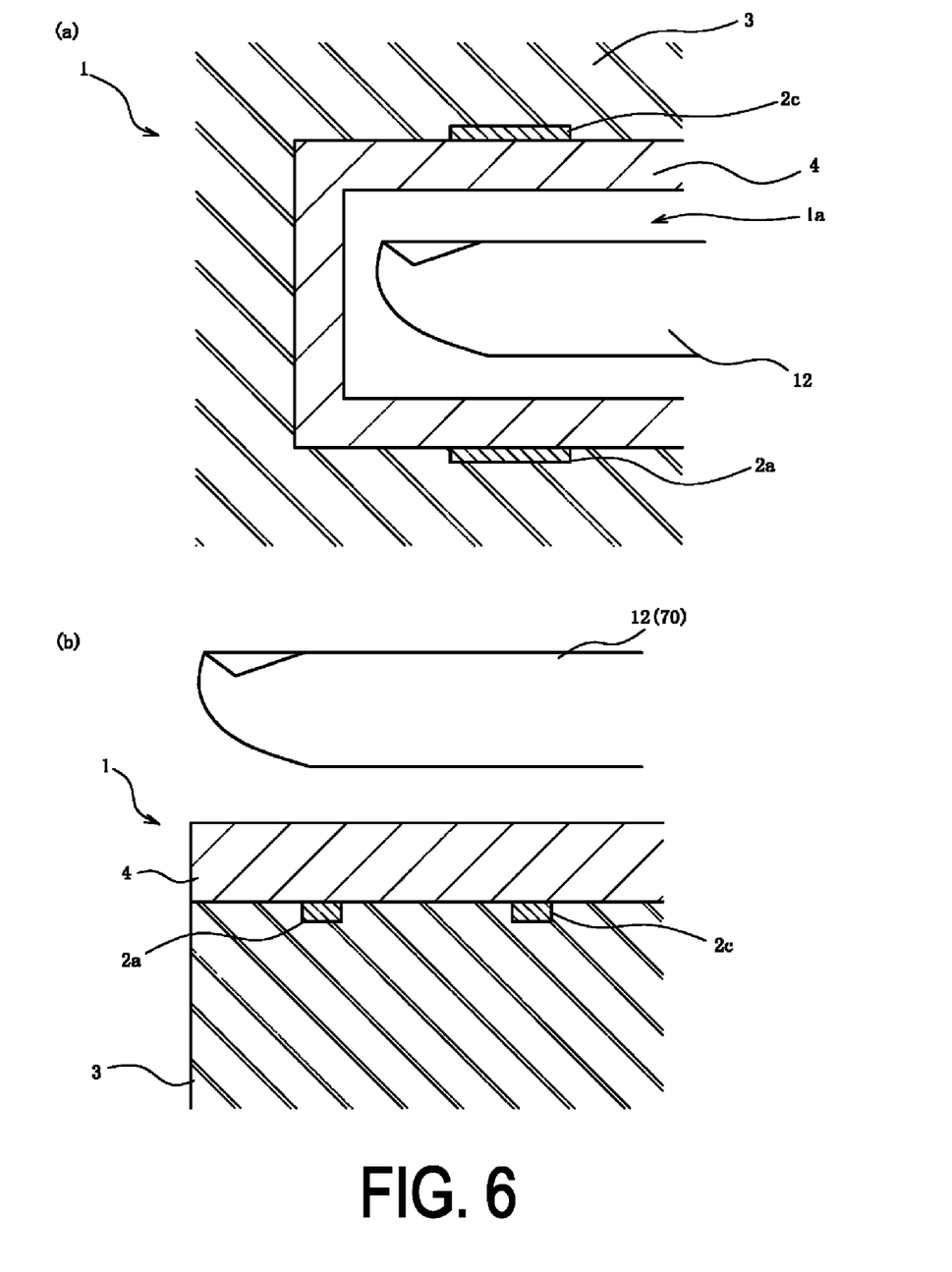
FIG. 6 is a schematic cross-sectional view illustrating an example of the automotive interior component that can perform vein authentication.

The vein authentication can use, for example, a transmissive imaging method or a reflective imaging method (see FIG. 6). Any method allows vein authentication in a non-contact manner. In the transmissive imaging method, the emission unit 2a and the imaging element 2c of the infrared sensor 2 are disposed so as to interpose a target portion of a finger 12 therebetween (see FIG. 6(a)). The automotive interior component 1 using this method has a recessed portion 1a into which the finger 12 is to be inserted. Since the surface material 4 transmits infrared rays, the infrared rays emitted from the emission unit 2a pass through the finger 12, and further passes through the surface material 4 above the finger to reach the imaging element 2c. Because the finger as the target for photographing is small, the recessed portion 1a, that is, the space for vein authentication can be reduced. In the reflective imaging method, the emission unit 2a and the imaging element 2c are disposed on the same side (see FIG. 6(b)). In this method, the vein of the finger 12 can be photographed or the vein of the hand 70 can be photographed.

The iris is a circular region around a pupil. There are irregularities of muscles in this region where fat deposits to form a random pattern. This pattern can be measured by infrared rays. The iris can be acquired simply by photographing an image of an eye, and therefore hygienic authentication in a non-contact manner is possible.

When a face image is acquired, face authentication is likely to be affected by makeup, an accessory, such as a pair of glasses and a hat, a lighting condition, and an orientation and a movement of the face. However, the use of near infrared rays allows reducing these influences.

In the surface material 4, a color difference $\Delta E$ between the region 4a corresponding to the emission unit 2a and the region 4b corresponding to the reception unit 2b of the infrared sensor 2 and a region other than the regions 4a, 4b may be 10 or less. The color difference $\Delta E$ can be calculated by the following Equation (1).

$$\angle E = \sqrt{(\Delta a^*)^2 + (\Delta b^*)^2 + (\Delta L^*)^2} \quad (1)$$

Here, $\Delta a^*$, $\Delta b^*$, and $\Delta L^*$ are values obtained by a difference between a*, b*, and L* values of the regions 4a, 4b that transmits infrared rays and a*, b*, and L* values of the region other than the regions 4a, 4b (that is, the region that does not transmit infrared rays) in the CIE (Commission Internationale de l'Elcairage) 1976 color space. With the color difference $\Delta E$ being 10 or less, the infrared transmission regions 4a, 4b become less noticeable, and a design property of the automotive interior component 1 can be further improved.

Two examples of a method for manufacturing the above-described automotive interior component 1 will be described. One method is a method that molds the molded body 3 in which the infrared sensor 2 is installed and bonds the surface material 4 that transmits infrared rays to the molded body 3. To obtain the molded body 3 in which the infrared sensor 2 is installed, for example, there is a method that forms the molded body 3 having a recessed portion with a size with which the infrared sensor 2 can be installed, and installs the infrared sensor 2 in the recessed portion. In addition, a method that disposes the infrared sensor 2 between a pair of molds, injects a resin in a space formed by mold clamping, and performs molding can also be used.

Another one is a method that disposes the surface material 4 that transmits infrared rays and the infrared sensor 2 between a pair of molds, injects a resin in a space formed by mold clamping, and performs molding. The infrared sensor 2 is fixed to the surface material 4 such that the position is not displaced.

In this way, the automotive interior component 1 can be obtained.

Figure 7:
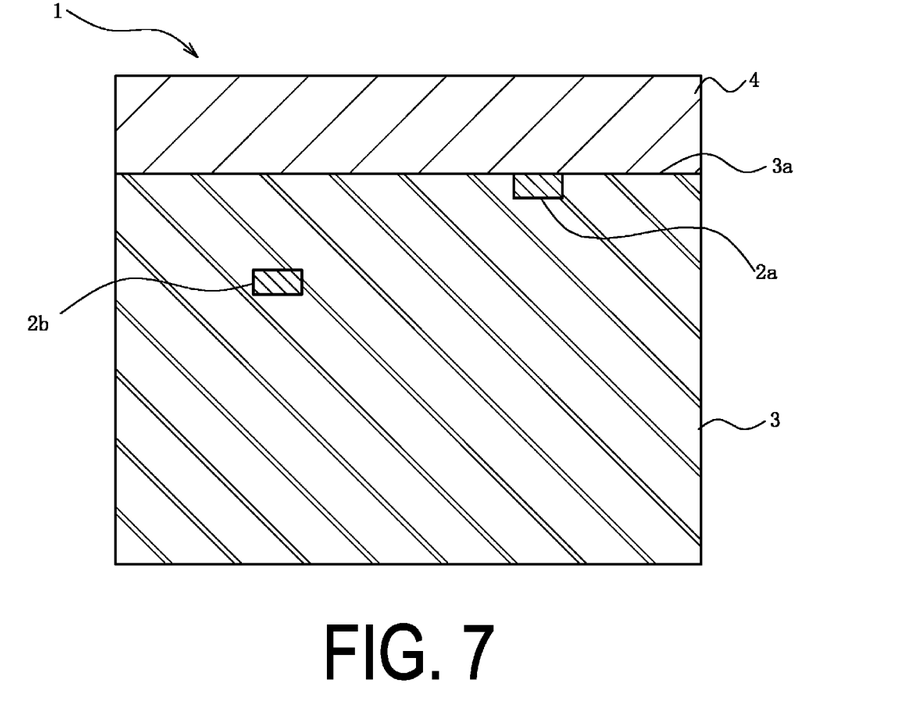
FIG. 7 is a schematic cross-sectional view illustrating a modified example of the automotive interior component.

Note that in the embodiment, the infrared sensor 2 is installed in the molded body 3 so that the surface 3a of the molded body 3 becomes flat, but the present disclosure is not limited thereto. For example, at least one of the emission unit 2a and the reception unit 2b may be installed at a location deeper than the surface 3a of the molded body (see FIG. 7). In this case, similarly to the surface material 4, the molded body 3 also needs to transmit infrared rays. An example of the method includes a method that molds the molded body 3 with a resin mixed with a pigment or a dye that transmits infrared rays.

BRIEF DESCRIPTION OF THE REFERENCE NUMERALS

1: Automotive interior component
101a: Recessed portion
2: Infrared sensor
2a: Emission unit
2b: Reception unit
2c: Imaging element
3: Molded body
3a: Surface of molded body
4: Surface material
4a: Region corresponding to emission unit
4b: Region corresponding to reception unit
40: Surface layer
41: Base cloth
42: Intermediate layer
43: Printed layer
44: Surface treatment layer
45: Ink
46: Base substrate
47: Infrared transmission sheet
5: Center console
6: Armrest
7: Driver
70: Hand
70a: Region on which hand is placed
8: Instrument panel
9: Steering wheel
10: Door trim
11: Seat (seat)
12: Finger
100: Automotive interior component
200: Switch base
210: Switch pressing unit
300: Molded body
400: Surface material
410: Marking portion

The invention claimed is:

1. An automotive interior component, comprising:
an infrared sensor that includes an emission unit and a reception unit, the emission unit emitting infrared rays to an object, the reception unit receiving the infrared rays reflected by the object;
a molded body that has a corner and incorporates the infrared sensor; and
a surface material that bends at the corner so as to cover the infrared sensor, the surface material being bonded along a surface of the molded body, the surface material transmitting the infrared rays; wherein
the infrared sensor is fixed to the surface material; or
the molded body transmits the infrared rays, and at least one of the emission unit and the reception unit is installed at a location deeper than the surface of the molded body.

2. The automotive interior component according to claim 1, wherein
the surface material has an infrared transmittance of 60% or more.

3. The automotive interior component according to claim 1, wherein
the reception unit of the infrared sensor is an imaging element.

4. The automotive interior component according to claim 1, wherein
a color difference ΔE between regions corresponding to the emission unit and the reception unit of the infrared sensor and a region other than the regions in the surface material is 10 or less.

5. The automotive interior component according to claim 2, wherein
the reception unit of the infrared sensor is an imaging element.

6. The automotive interior component according to claim 5, wherein
a color difference ΔE between regions corresponding to the emission unit and the reception unit of the infrared sensor and a region other than the regions in the surface material is 10 or less.

7. The automotive interior component according to claim 2, wherein
a color difference ΔE between regions corresponding to the emission unit and the reception unit of the infrared sensor and a region other than the regions in the surface material is 10 or less.

8. The automotive interior component according to claim 3, wherein
a color difference ΔE between regions corresponding to the emission unit and the reception unit of the infrared sensor and a region other than the regions in the surface material is 10 or less.

* * * * *